US011927527B2

(12) United States Patent
Maruyama et al.

(10) Patent No.: US 11,927,527 B2
(45) Date of Patent: Mar. 12, 2024

(54) SPECTROPHOTOMETER, SPECTROSCOPIC MEASUREMENT METHOD, AND PROGRAM

(71) Applicant: HITACHI HIGH-TECH SCIENCE CORPORATION, Tokyo (JP)

(72) Inventors: Kai Maruyama, Tokyo (JP); Takayuki Wakui, Tokyo (JP)

(73) Assignee: HITACHI HIGH-TECH SCIENCE CORPORATION, Tokyo (JP)

(*) Notice: Subject to any disclaimer, the term of this patent is extended or adjusted under 35 U.S.C. 154(b) by 0 days.

(21) Appl. No.: 17/841,124

(22) Filed: Jun. 15, 2022

(65) Prior Publication Data

US 2022/0412879 A1    Dec. 29, 2022

(30) Foreign Application Priority Data

Jun. 25, 2021 (JP) ................. 2021-105788

(51) Int. Cl.
*G01J 3/28* (2006.01)
*G01N 21/25* (2006.01)
*G01N 21/33* (2006.01)
*G01N 21/3577* (2014.01)
(Continued)

(52) U.S. Cl.
CPC ........... *G01N 21/255* (2013.01); *G01N 21/33* (2013.01); *G01N 21/3577* (2013.01); *G01N 21/359* (2013.01); *G01N 21/59* (2013.01); *G01N 2201/117* (2013.01)

(58) Field of Classification Search
CPC ...... G01N 21/255; G01N 21/31; G01N 21/01; G01N 21/274; G01N 21/33; G01N 21/3577; G01N 21/359; G01N 21/59; G01N 2021/0112; G01N 2201/117; G01J 3/0213; G01J 3/0235; G01J 3/027; G01J 3/08; G01J 3/12; G01J 3/28; G01J 3/42
See application file for complete search history.

(56) References Cited

U.S. PATENT DOCUMENTS 5,250,811 A * 10/1993 Lippert .............. G01N 21/3559
250/359.1
5,699,156 A * 12/1997 Carver ...................... G01J 3/02
356/411
(Continued)

FOREIGN PATENT DOCUMENTS

JP    2001208679 A    8/2001
JP    2007093410 A    4/2007

*Primary Examiner* — Abdullahi Nur
(74) *Attorney, Agent, or Firm* — Holland & Hart LLP

(57) ABSTRACT

When a measurement sample whose absorbance greatly changes depending on a wavelength range is measured, measurement with a high S/N ratio and accuracy can be efficiently performed in a short time.

For a plurality of wavelength ranges in wavelength scanning measurement of a measurement sample, based on measurement conditions including one of a plurality of dimming plates (16a to 16e) to be disposed in each wavelength range and a scanning speed of a wavelength to be set in each wavelength range, when wavelength scanning measurement in which the entire measurement wavelength range including all of the plurality of wavelength ranges is scanned at once is performed, a spectrophotometer (100) changes one of the plurality of dimming plates (16a to 16e) and the scanning speed according to the measurement conditions for each wavelength range.

12 Claims, 9 Drawing Sheets

(51) Int. Cl.
    *G01N 21/359*     (2014.01)
    *G01N 21/59*     (2006.01)

(56) References Cited

U.S. PATENT DOCUMENTS 7,978,324 B2 * 7/2011 Pan .......................... G01J 3/02
    356/328
9,829,430 B2 * 11/2017 Wakui .................... G01N 21/31

* cited by examiner

SPECTROPHOTOMETER, SPECTROSCOPIC MEASUREMENT METHOD, AND PROGRAM

CROSS-REFERENCE TO RELATED APPLICATION

Priority is claimed on Japanese Patent Application No. 2021-105788, filed Jun. 25, 2021, the content of which is incorporated herein by reference.

BACKGROUND OF THE INVENTION

Field of the Invention

The present invention relates to a spectrophotometer, a spectroscopic measurement method, and a program.

Description of Related Art

In a conventional spectrophotometer, when a sample having high absorbance, that is, very low transmittance, is measured, a correct signal value may not be obtained due to the sensitivity of a detector, the limitation on the number of conversion bits of an analog/digital (A/D) converter, and the limitation on the number of digits of storage variables used in internal calculation, and the like. Assuming such a case, a double beam spectrophotometer that divides light emitted from a spectroscope into two light fluxes and irradiates a measurement sample for which the original absorbance is desired to be measured and a reference control sample with light may be used.

In a double beam spectrophotometer, a dimming plate is inserted in a control optical path of a control sample to reduce a light intensity of control light. Thus, after light is measured using the reduced light intensity, the amount of dimming is corrected to obtain a more accurate signal value.

Patent Document 1 discloses a technology in which, in a double beam type spectrophotometer which splits light from a light source with a spectroscope and then branches it into sample light and control light, and detects it with an optical detector, when the transmittance of a sample is obtained from a sample signal and a control signal detected by the optical detector, an attenuation rate is obtained and stored for a predetermined wavelength of the dimming plate inserted in the control optical path, and correction is performed on the measurement result of the sample using this stored attenuation rate.

Patent Document 2 discloses a double beam type spectrophotometer which measures a ratio of light intensities of light beams that have passed through a sample cell and a control cell, reduces the light intensity of the light beam that has passed through the control cell when the light intensity ratio is equal to or less than a predetermined threshold value, and sets the light intensity ratio to a threshold value or more.

PATENT DOCUMENTS

[Patent Document 1] Japanese Unexamined Patent Application Publication No. 2001-208679
[Patent Document 2] Japanese Unexamined Patent Application Publication No. 2007-93410

SUMMARY OF THE INVENTION

In the related art, in a double beam type spectrophotometer, when a measurement sample having high absorbance, that is, low transmittance, in a measurement wavelength range is measured, the difference between light intensities of sample light that passes through a measurement sample, which is a measurement target, and control light that does not pass through the measurement sample (that is, passes through the control sample) becomes large, and the accuracy decreases. In such a case, the accuracy is improved by reducing the light intensity of control light using a dimming plate or the like. In this case, since the light intensities of the sample light and the control light are both small, it is general to increase the number of times of integration of measurement signals by performing measurement at a low wavelength scanning speed and reduce noise.

In some measurement samples, high absorbance (that is, low transmittance) and low absorbance (that is, high transmittance) coexist in a measurement wavelength range, and the absorbance greatly changes depending on the wavelength. Even when such a sample is measured by one scan, in order to perform accurate measurement in a wavelength range with high absorbance, it is necessary to dim control light in the entire measurement wavelength range and perform measurement at a low wavelength scanning speed.

In this case, there is a problem that the measurement time becomes inevitably long. In addition, when control light is dimmed in the entire measurement wavelength range, since control light that does not pass through the measurement sample is dimmed even in a wavelength range with low absorbance, the difference between light intensities of the sample light and the control light becomes large, and it is difficult to perform measurement with high accuracy in the entire measurement wavelength range. In order to obtain a favorable spectrum in the entire measurement wavelength range, it is necessary to perform measurement a plurality of times by changing measurement conditions such as a wavelength scanning speed and dimming of the control light in a wavelength range with high absorbance and a wavelength range with low absorbance, and there is a risk of the burden on an operator increasing.

For the double beam type spectrophotometer disclosed in Patent Document 1, it is necessary to determine an attenuation rate of the dimming plate before the sample is measured. Therefore, the measurement time increases and it is difficult to accurately measure a sample whose absorbance greatly changes depending on the wavelength described above with one scan.

The double beam type spectrophotometer disclosed in Patent Document 2 determines whether it is necessary to dim control light during sample measurement. However, since control light is dimmed in the entire measurement wavelength range, it is difficult to accurately measure a sample whose absorbance greatly changes depending on the wavelength described above with one scan.

The present invention has been made in view of the above problems, and an object of the present invention is to provide a spectrophotometer, a spectroscopic measurement method, and a program, which are suitable for accurately measuring a measurement sample whose absorbance greatly changes depending on a wavelength range with few scans.

In order to address the above problem, the present invention has the following configuration. Specifically, a spectrophotometer includes a light source; a spectroscope that splits light from the light source; an optical path switch that switches an optical path of light emitted from the spectroscope to a sample optical path that reaches a measurement sample or a control optical path that reaches a control sample; a detector that detects sample light that has passed through the measurement sample and control light that has passed through the control sample; a data processing unit that derives absorbance of the measurement sample based on a measurement sample signal of the sample light and a control sample signal of the control light detected by the detector; a plurality of dimming plates having different dimming rates; a dimming plate switching unit that is able to switch and install plurality of dimming plates in the control optical path; a storage that stores measurement conditions including one of the plurality of dimming plates and a scanning speed for each of a plurality of wavelength ranges; and a controller that changes the dimming plate and the scanning speed corresponding to each of the plurality of wavelength ranges according to the measurement conditions when the entire measurement wavelength range including the plurality of wavelength ranges is scanned at once.

In addition, another aspect of the present invention has the following configuration. Specifically, a spectroscopic measurement method used in a spectrophotometer including a light source; a spectroscope that splits light from the light source; an optical path switch that switches an optical path of light emitted from the spectroscope to a sample optical path that reaches a measurement sample or a control optical path that reaches a control sample; a detector that detects sample light that has passed through the measurement sample and control light that has passed through the control sample; a data processing unit that derives absorbance of the measurement sample based on a measurement sample signal of the sample light and a control sample signal of the control light detected by the detector; a plurality of dimming plates having different dimming rates; a dimming plate switching unit that is able to switch and install plurality of dimming plates in the control optical path; and a storage that stores measurement conditions including one of the plurality of dimming plates and a scanning speed for each of a plurality of wavelength ranges, the method including a step of changing the dimming plate and the scanning speed corresponding to each of the plurality of wavelength ranges according to the measurement conditions when the entire measurement wavelength range including the plurality of wavelength ranges is scanned at once.

In addition, another aspect of the present invention has the following configuration. Specifically, a program causing a spectrophotometer to execute a spectroscopic measurement method, the spectrophotometer including a light source; a spectroscope that splits light from the light source; an optical path switch that switches an optical path of light emitted from the spectroscope to a sample optical path that reaches a measurement sample or a control optical path that reaches a control sample; a detector that detects sample light that has passed through the measurement sample and control light that has passed through the control sample; a data processing unit that derives absorbance of the measurement sample based on a measurement sample signal of the sample light and a control sample signal of the control light detected by the detector; a plurality of dimming plates having different dimming rates; a dimming plate switching unit that is able to switch and install plurality of dimming plates in the control optical path; and a storage that stores measurement conditions including one of the plurality of dimming plates and a scanning speed for each of a plurality of wavelength ranges, the program executing the spectroscopic measurement method including: a step of changing the dimming plate and the scanning speed corresponding to each of the plurality of wavelength ranges according to the measurement conditions when the entire measurement wavelength range including the plurality of wavelength ranges is scanned at once.

According to the present invention, even when a measurement sample whose absorbance greatly changes depending on a wavelength range is measured, it is possible to efficiently perform measurement with a high S/N ratio and high accuracy with fewer scans in the entire measurement wavelength range.

DETAILED DESCRIPTION OF THE INVENTION

Figure 1:
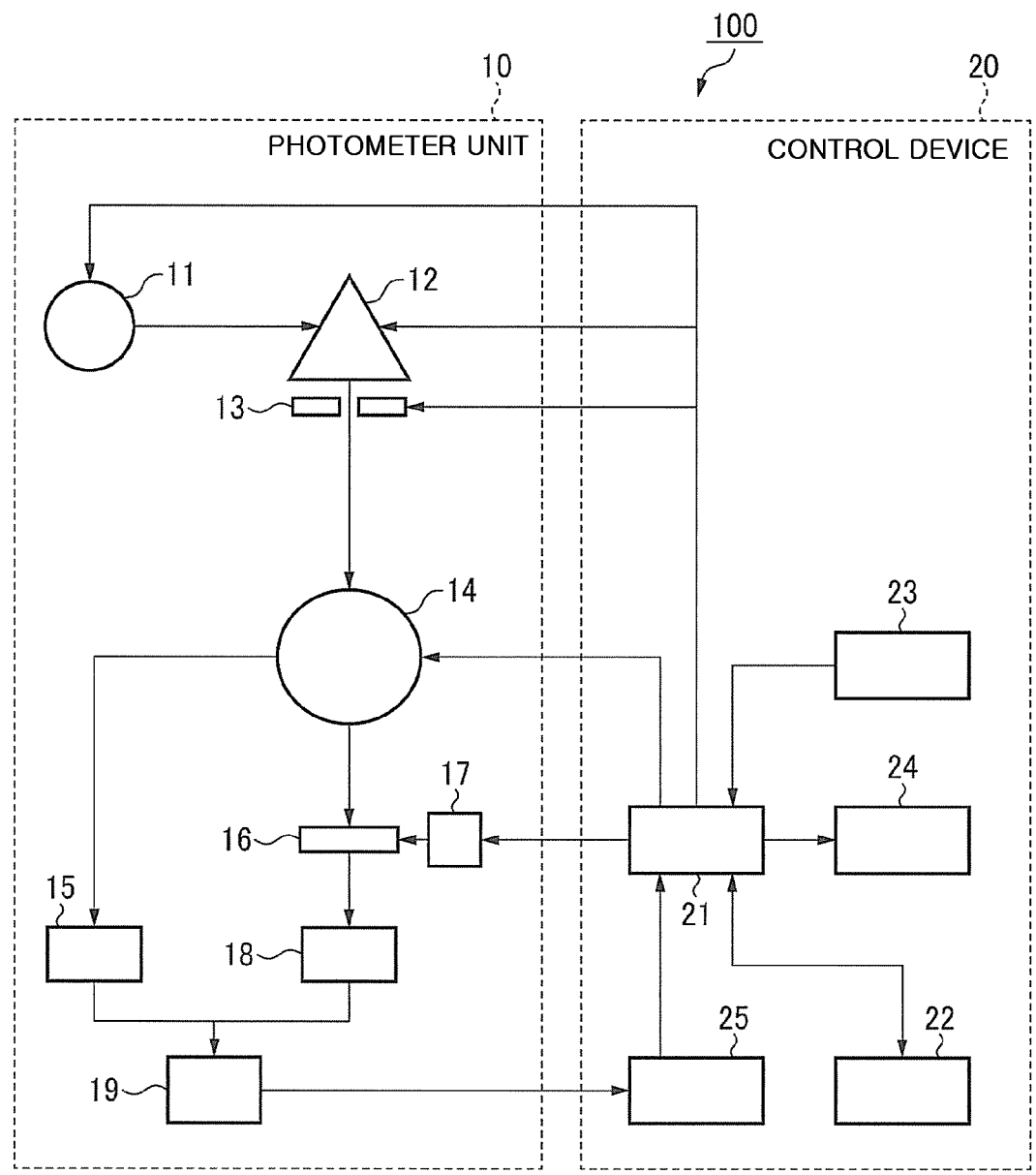
FIG. 1 is a block diagram showing an outline of a configuration of a spectrophotometer according to a first embodiment of the present invention.

Hereinafter, forms for implementing the present invention will be described with reference to the drawings. Here, embodiments to be described below are embodiments for explaining the present invention, and are not intended to be interpreted as limiting the present invention, and not all configurations described in the embodiments are essential configurations for achieving the object of the present invention. In addition, in the drawings, the same components are denoted with the same reference numerals to indicate correspondence relations.

First Embodiment

Hereinafter, a first embodiment of the present invention will be described.

[Device Configuration]

FIG. 1 is a block diagram showing an outline of a spectrophotometer 100 according to the first embodiment of the present invention. The spectrophotometer 100 mainly includes a photometer unit 10 for performing spectroscopic measurement, and a control device 20 that electrically and mechanically controls the photometer unit 10. Here, in the spectrophotometer 100, the photometer unit 10 and the control device 20 may be configured as an integral type or may be configured in separate housings that are connected in a communicable manner.

The photometer unit 10 includes a light source 11, a spectroscope 12, a slit member 13, an optical path switch 14, a measurement sample holder 15, a dimming plate holder 16, a dimming plate switching unit 17, a control sample holder 18, and a detector 19.

The light source 11 emits light necessary for measurement, and is composed of, for example, a deuterium discharge tube for ultraviolet/visible light, a halogen lamp for visible/near infrared light, a xenon flash lamp, and the like, and the type thereof and the number thereof are not limited. The spectroscope 12 wavelength-distributes and splits light emitted from the light source 11 for each wavelength range used for measurement. The slit member 13 is a part of the spectroscope 12, and has a slit (not shown) through which light emitted from the spectroscope 12 passes, and shapes light having a specific wavelength range into a light beam. The spectroscope 12 additionally includes elements and configurations necessary for light splitting such as a diffraction grating and a mirror, and general parts can be used, and the structure and type thereof are not particularly limited.

The optical path switch 14 is a device for switching a path of light emitted from the spectroscope 12 and the slit member 13 to a predetermined optical path (including light shielding) according to a measurement manner. The optical path switch 14 is composed of, for example, an SRZ sector. Such an SRZ sector has three areas, for example, an area in which light is blocked (Zero area), an area in which a path of light is switched to a sample optical path in which a measurement sample as a measurement target is disposed (Sample area), and an area in which a path of light is switched to a control optical path in which a control sample is disposed (Reference area), blocks light, or switches the path of light. However, the structure and type of the optical path switch 14 are not particularly limited. The number of areas to be divided can be set arbitrarily.

The measurement sample holder 15 is a part that holds a measurement sample (hereinafter referred to as this sample) which is a target whose absorbance (or transmittance) is to be measured by the spectrophotometer 100. The measurement sample holder 15 is composed of, for example, a cell that holds a liquid sample, and the structure and type thereof are not particularly limited. When the optical path switch 14 sets the sample optical path toward the measurement sample holder 15 as the optical path for the sample light, the sample light passes through the measurement sample held by the measurement sample holder 15.

The dimming plate holder 16 is a device disposed in the control optical path in which the control sample is disposed and for adjusting a light intensity of light from the optical path switch 14. The dimming plate holder 16 includes a plurality of dimming plates through which light from the optical path switch 14 passes. Details of the dimming plate holder 16 will be described below with reference to FIG. 2. The dimming plate switching unit 17 is a unit that is controlled by a controller 21 to be described below and for switching the plurality of dimming plates of the dimming plate holder 16. The dimming plate switching unit 17 is composed of a stepping motor or the like, the structure and type thereof are not particularly limited.

The control sample holder 18 is a part that holds a control sample (hereinafter referred to as a reference sample) in order to acquire reference data when the measurement sample of the measurement sample holder 15 is measured. Like the measurement sample holder 15, the control sample holder 18 is composed of, for example, a cell that holds a liquid sample, and the structure and type thereof are not particularly limited. When the optical path switch 14 sets the control optical path toward the control sample holder 18 as the optical path for the control light, the control light passes through the dimming plate of the dimming plate holder 16 and the control sample held by the control sample holder 18.

The detector 19 detects the sample light that has passed through the measurement sample held by the measurement sample holder 15 or the control light that has passed through the control sample held by the control sample holder 18. The detector 19 detects the sample light that has passed through the measurement sample held by the measurement sample holder 15, generates a measurement sample signal corresponding to the light intensity, and outputs it to a data processing unit 25 to be described below. The detector 19 also detects the control light that has passed through the control sample of the control sample holder 18, generates a control sample signal corresponding to the light intensity, and outputs it to the data processing unit 25. The detector 19 is composed of a photomultiplier tube or the like, and the structure and type thereof are not particularly limited.

In this manner, the spectrophotometer 100 of the present embodiment is a so-called double beam type spectrophotometer (hereinafter may be referred to as a double beam spectrophotometer) using two light fluxes, sample light that has passed through the measurement sample and control light that has passed through the control sample. The measurement sample as a measurement target may have a wavelength range with high absorbance (that is, low transmittance) in at least a part of the entire measurement wavelength range. When such a measurement sample is measured, if the light intensity of the sample light in the sample optical path and the light intensity of the control light in the control optical path are the same in a wavelength range with high absorbance, the difference between light intensities of light beams that have passed through the two paths increases, and as a result, there is a risk of the measurement accuracy decreasing. Therefore, the spectrophotometer 100 improves the accuracy by reducing the light intensity of the control light in the control optical path using the dimming plate of the dimming plate holder 16. In this manner, the double beam type spectrophotometer according to the present embodiment minimizes the difference between light intensities of the sample light and the control light. Accordingly, even when a measurement sample having high absorbance, that is, very low transmittance, is measured, measurement with high accuracy can be expected.

The control device 20 includes the controller 21, a storage 22, an operation unit 23, a display unit 24, and the data processing unit 25. The controller 21 is a device that mainly controls the operation of the spectrophotometer 100. The controller 21 performs control such as whether or not light of the light source 11 is emitted, wavelength scanning by the spectroscope 12, switching of optical paths by the optical path switch 14, and switching of dimming plates by the dimming plate switching unit 17, for example, according to the measurement conditions input to the operation unit 23. The controller 21 is composed of a general computer, a control circuit, a processor, and the like, and the structure and type thereof are not particularly limited.

The storage 22 is a storage device that stores a program read by the controller 21 in order to control the operation of the spectrophotometer 100, for example, a spectroscopic measurement program for implementing a spectroscopic measurement method according to the present embodiment, other programs, measurement data obtained by measurement, other data, and the like. The storage 22 is composed of a volatile or non-volatile memory, a hard disk and the like, and the structure and type thereof are not particularly limited. In addition, the storage 22 can be disposed in an external server, a cloud computer or the like that is physically connected to the spectrophotometer 100 via a network, and does not necessarily have to be provided in the spectrophotometer 100. In addition, the control device 20 may further include a connecting part for connection to an external device in a wired or wireless manner.

The operation unit 23 is a device in which an operator of the spectrophotometer 100 inputs an operation to the spectrophotometer 100 and transmits an input signal to the controller 21. The operator here may include not only a person who actually operates the spectrophotometer 100 but also participants in a broad sense such as a person who manages measurement and a person who uses the result. The operation unit 23 is composed of a keyboard, a mouse, a touch panel and the like, and the structure and type thereof are not particularly limited. The display unit 24 displays the result of a process performed by the controller 21 (such as an absorbance spectrum), and functions as a user interface shown for the operator of the spectrophotometer 100. The display unit 24 is composed of a liquid crystal display and the like, and the structure and type thereof are not particularly limited. The data processing unit 25 can derive the transmittance, the absorbance Abs and the like of the sample based on the signal output from the detector 19, and generate an absorbance spectrum. The data processing unit 25 is mainly composed of a computer dedicated to calculation, a processing circuit, a processor and the like, and the structure and type thereof are not particularly limited.

(Dimming Plate)

Figure 2:
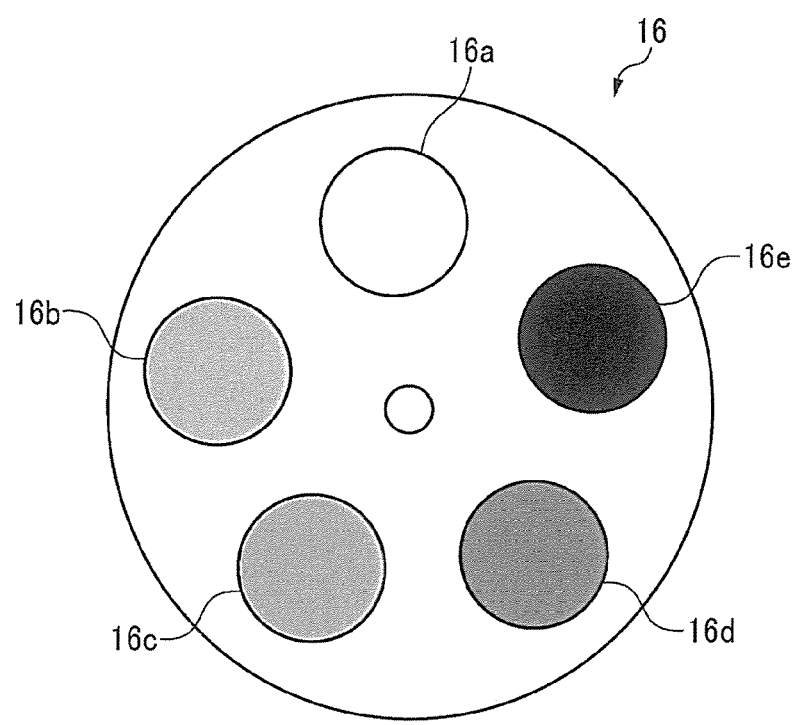
FIG. 2 is a plan view showing a configuration example of a dimming plate holder including a plurality of dimming plates.

FIG. 2 is a plan view showing a conceptual configuration of the dimming plate holder 16 according to the present embodiment. The dimming plate holder 16 is a device for adjusting a light intensity of light from the optical path switch 14. In the present embodiment, the dimming plate holder 16 has a circular flat plate structure, and includes a plurality of dimming plates 16a to 16e through which light from the optical path switch 14 passes. Under control of the controller 21, the dimming plate switching unit 17 rotates the dimming plate holder 16, switches between the plurality of dimming plates 16a to 16e through which control light passes, and installs any one of the dimming plates 16a to 16e in the control optical path. The plurality of dimming plates 16a to 16e have the following different dimming performances, that is, different dimming rates, for adjusting the control light (reducing the light intensity). Here, five dimming plates have been exemplified, and the structure and type of the dimming plate holder 16, and the structure, type, number, or dimming rate of the dimming plate are not particularly limited. In addition, instead of the dimming plate holder 16 shown in FIG. 2, the plurality of dimming plates 16a to 16e may be individually prepared, and the dimming plate switching unit 17 may be installed so that these dimming plates are replaced in the control optical path. In addition, the light intensity may be adjusted by combining a plurality of dimming plates and disposing them in the control optical path.

First dimming plate 16a: no dimming (absorbance: 0 Abs)
Second dimming plate 16b: dimming to 1/10 (absorbance: 1 Abs)
Third dimming plate 16c: dimming to 1/100 (absorbance: 2 Abs)
Fourth dimming plate 16d: dimming to 1/1000 (absorbance: 3 Abs)
Fifth dimming plate 16e: dimming to 1/10000 (absorbance: 4 Abs)

As will be described below, when a measurement sample whose absorbance changes depending on a wavelength of the measurement target is measured, the spectrophotometer 100 performs switching to any of the first dimming plate 16a, the second dimming plate 16b, the third dimming plate 16c, the fourth dimming plate 16d, and the fifth dimming plate 16e of the dimming plate holder 16 and disposing it in the control optical path, according to the absorbance for each wavelength range. Accordingly, the intensity of light that passes through the control sample can be changed according to the absorbance different for each wavelength of the measurement sample, and appropriate measurement can be performed.

Next, computation of the absorbance Abs of the sample performed by the data processing unit 25 will be described. The absorbance Abs can be calculated by the following Formula (1) after the transmittance T is acquired.

$$\text{Absorbance Abs} = -\log(1/T) \quad (1)$$

In the double beam type spectrophotometer, the transmittance T is determined by the ratio of the measurement sample signal of the sample light that has passed through the measurement sample and the control sample signal of the control light that has passed through the control sample. As described above, the detector 19 outputs these signals.

Ideally, when the light intensity is zero (such as when the light source 11 does not emit light or when the optical path switch 14 is set in an area in which light is blocked), the detector 19 should output a zero signal. However, when measurement is actually performed, even if the intended light intensity is zero, the detector 19 inevitably detects ambient light, albeit in a small amount. As a result, the detector 19 outputs a predetermined non-zero value. Therefore, the data processing unit 25 calculates the transmittance T by the following Formula (2) in consideration of the value output from the detector 19 when the light intensity is zero (hereinafter referred to as a "signal when the light intensity is zero").

$$\text{Transmittance } T = \text{(measurement sample signal} - \text{signal when the light intensity is zero)}/\text{(control sample signal} - \text{signal when the light intensity is zero)} \quad (2)$$

In addition, the spectrophotometer 100 performs baseline correction. When the measurement sample is not set in the measurement sample holder 15, the transmittance T is ideally 1 (100%). However, when measurement is actually performed, even if the measurement sample is not set in the measurement sample holder 15, the transmittance T does not become 1 (100%) due to the influence of the reflectance of the mirror incorporated into the spectroscope 12.

Therefore, the spectrophotometer 100 performs baseline correction in order to set the transmittance T when the measurement sample is not set to 1 (100%). In the baseline correction, spectroscopic measurement is performed when no measurement sample is installed, and the value of the transmittance obtained in this case is acquired as baseline data. Thus, the data processing unit 25 corrects the transmittance deviating from the standard transmittance T=1 (100%) by dividing the absorbance measured when the measurement sample is set by the baseline data. When baseline data is measured, the dimming plates 16a to 16e used in actual measurement are set, and thus correction can be performed in consideration of the transmittance of the dimming plates 16a to 16e.

For example, when the third dimming plate 16c is used, that is, when the transmittance (dimming rate) of the dimming plate is set to 1/100 (=2 Abs), the data processing unit 25 obtains baseline data at 1/(1/100)=100 (10000% T) when the measurement sample is not provided. On the other hand, when a measurement sample having a transmittance of 1/10 (=1 Abs) is set and measurement is performed, the third dimming plate 16c having a transmittance of 1/100 is set on the side of the control sample. Therefore, the data processing unit 25 computes the transmittance T of the measurement sample as T=(1/10)/(1/100)=10 (1000% T). In addition, the data processing unit 25 divides this by 100 (10000% T), which is for baseline data, and a correct Abs value can be computed with $^{10}/_{100}=^{1}/_{10}$ (=1 Abs).

The spectrophotometer 100 according to the present embodiment can automatically switch the plurality of dimming plates 16a to 16e of the dimming plate holder 16, that is, the spectrophotometer 100 can automatically switch the transmittance of the dimming plates. In addition, the spectrophotometer 100 can switch the dimming plate and the scanning speed by dividing a plurality of wavelength ranges in one wavelength scanning measurement over the entire measurement wavelength range. Accordingly, even if the measurement sample has a wavelength range with high absorbance and a wavelength range with low absorbance, the absorbance can be measured for each wavelength range under optimal measurement conditions. Hereinafter, an example of a spectroscopic measurement method using the spectrophotometer 100 of the present embodiment will be described.

[Measurement Operation]

The measurement sample which is a target whose absorbance is to be measured has a wavelength range with high absorbance (that is, low transmittance) and a wavelength range with low absorbance (that is, high transmittance) in the entire measurement wavelength range in which measurement is attempted. When such a measurement sample is measured, the spectrophotometer 100 according to the present embodiment refers to a preset absorbance spectrum of the measurement sample, and selects and sets an appropriate dimming plate and a scanning speed of the wavelength according to a change in the absorbance (transmittance).

In the wavelength range with low absorbance (that is, high transmittance), the spectrophotometer 100 selects a dimming plate having a low dimming rate (or no dimming plate) and a high scanning speed, and performs measurement. On the other hand, in the wavelength range with high absorbance (that is, low transmittance), the spectrophotometer 100 selects a dimming plate having a high dimming rate and a slow scanning speed, and performs measurement. The spectrophotometer 100 holds measurement conditions including at least a dimming plate and a scanning speed, selects and sets a dimming plate and a scanning speed according to the measurement conditions, calculates the absorbance, and obtains an absorbance spectrum.

Figure 3:
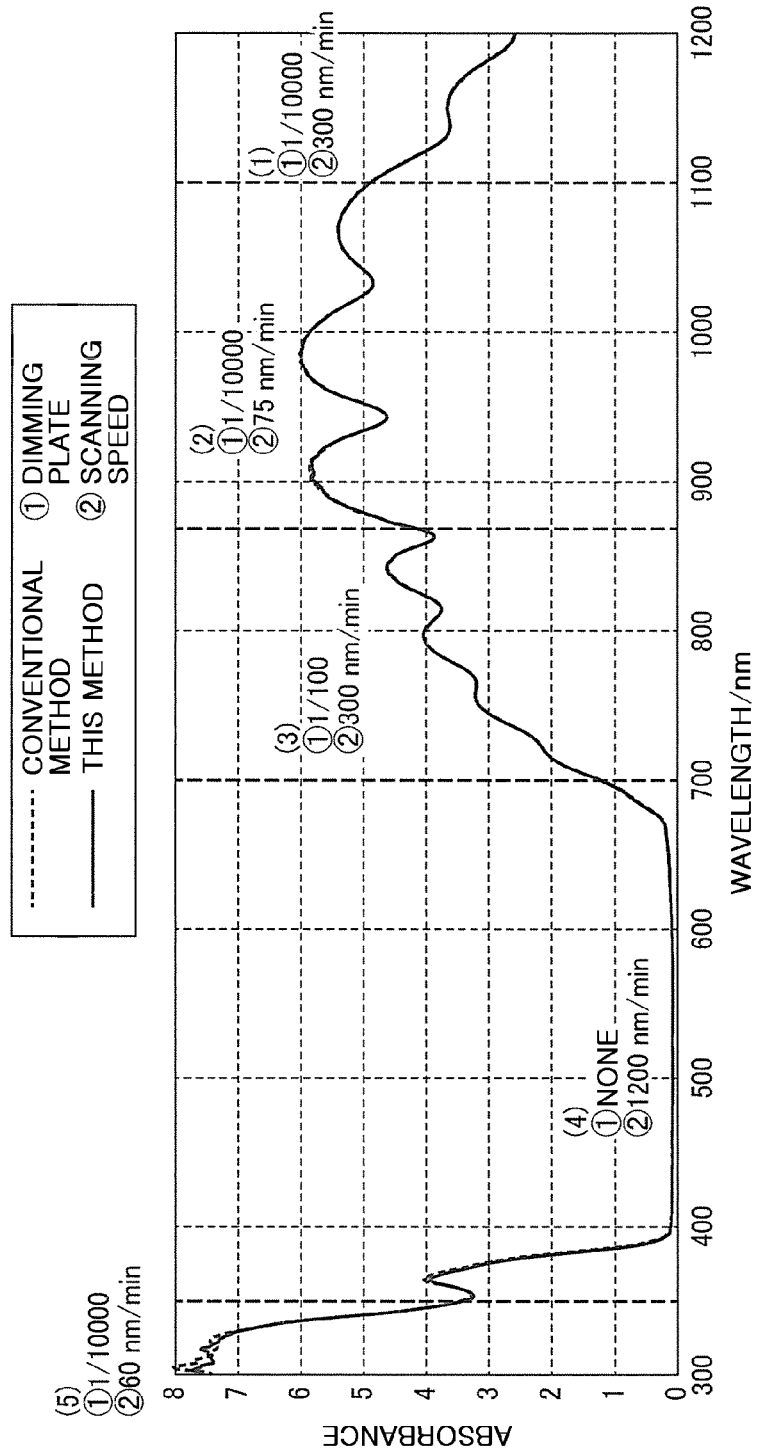
FIG. 3 is a graph showing absorbance spectrum for a predetermined substance.

FIG. 3 is a graph showing an example of an absorbance spectrum for a predetermined substance. In FIG. 3, the vertical axis represents absorbance, and the horizontal axis represents wavelength. This absorbance spectrum is known spectrum obtained in advance in a previous experiment or the like. In this example, the entire measurement wavelength range in which scanning is performing is set to 1,200 nm (start wavelength)-300 nm (end wavelength). In this case, a wavelength range with low absorbance such as 700 nm-400 nm and a wavelength range with high absorbance such as 1,100 nm-870 nm coexist, and the absorbance (transmittance) greatly changes depending on the wavelength. Here, in the present embodiment, the operator determines various conditions such as the size of the entire measurement wavelength range in which measurement is to be performed, the start wavelength, and the end wavelength according to the measurement target substance.

When the operator desires to measure a measurement sample of an identical kind to the substance in FIG. 3, the operator refers to the absorbance spectrum displayed on the display unit 24, selects and sets the measurement conditions related to the dimming plate and the scanning speed, and inputs the conditions using the operation unit 23. For example, as shown in FIGS. 3(1) to 3(5), the operator can set measurement conditions for each wavelength range. Here, the operator determines the boundary wavelength that divides wavelength ranges according to the value of the absorbance in the absorbance spectrum obtained in advance for a substance of the identical kind to the measurement sample shown in FIG. 3. The boundary wavelengths in FIG. 3 are 1,100 nm, 900 nm, 700 nm, and 350 nm. When four boundary wavelengths are set, five wavelength ranges are set.

Here, the boundary wavelength may be determined by the operator by observing the value of the absorbance in the absorbance spectrum in FIG. 3. The operator can determine the boundary wavelength in the wavelength range in which measurement conditions are changed according to the absolute value of the absorbance, the rate of change (slope of the spectrum) of the absorbance, and the like. Similarly, the scanning speed under measurement conditions can be determined. However, a method of determining the boundary wavelength and the scanning speed is not limited thereto, and for example, the controller 21 may determine the boundary wavelength, the number thereof, and the scanning speed based on a predetermined rule.

Under control of the controller 21, the storage 22 stores set measurement conditions. The following Table 1 shows an approximate absorbance and measurement conditions (the dimming plate and the scanning speed) selected according to the absorbance, which are stored in the storage 22, for example, in the form of a table. Table 1 corresponds to each wavelength range shown in FIG. 3.

TABLE 1

| | | Measurement conditions | |
|---|---|---|---|
| Wavelength range (nm) | Absorbance of substance (Abs) | Transmittance of dimming plate | Scanning speed (nm/min) |
| (1) 1200-1100 | About 3-5 | 1/10000 (corresponding to 4 Abs) | 300 |
| (2) 1100-870 | About 4-6 | 1/10000 (corresponding to 4 Abs) | 75 |
| (3) 870-700 | About 1-4 | 1/100 (corresponding to 2 Abs) | 300 |
| (4) 700-350 | Close to 0 | None | 1,200 |
| (5) 350-300 | About 4-8 | 1/10000 (corresponding to 4 Abs) | 60 |

For a plurality of wavelength ranges in wavelength scanning measurement of the measurement sample, measurement conditions including one of the plurality of dimming plates 16a to 16e to be disposed in each wavelength range and the scanning speed of the wavelength to be set in each wavelength range are set and stored. Regarding setting of the measurement conditions, the storage 22 may store measurement conditions for a substance of the identical kind to the measurement sample in advance, and when the operator designate a substance, may present measurement conditions corresponding to the measurement sample from among a plurality of measurement conditions. Here, the substance of the identical kind may be, for example, a sample having the same main composition or a sample whose spectral characteristics are inferred to be the same or similar, and is not narrowly limited.

The spectrophotometer 100 automatically operates under measurement conditions stored in the storage 22 and measures an absorbance spectrum of the measurement sample. Here, a basic spectroscopic measurement program for implementing the spectroscopic measurement method according to the present embodiment may be stored in the storage 22 in advance, and realized by the controller 21 by adjusting set values of a part related to the measurement conditions within the spectroscopic measurement program.

When wavelength scanning measurement in which the entire measurement wavelength range including all of the plurality of wavelength ranges described above is scanned at once is performed, the controller 21 performs switching to one of the plurality of dimming plates 16a to 16e to be installed according to the measurement conditions, and additionally changes the scanning speed.

When measurement is performed, the spectrophotometer 100 performs baseline measurement when the measurement sample is not installed based on the measurement conditions before the absorbance of the measurement sample is obtained. The dimming plate switching unit 17 activated by control of the controller 21 performs baseline data measurement using the set scanning speed while performing switching to any of the dimming plates 16a to 16e selected in each wavelength range. The data processing unit 25 acquires the obtained baseline data, and the controller 21 stores the baseline data in the storage 22.

Then, a measurement sample to be measured by the operator is installed, and the spectrophotometer 100 measures the absorbance of the measurement sample. In the absorbance measurement, the transmittance and the absorbance of the measurement sample are measured using the set scanning speed while performing switching to any of the dimming plates 16a to 16e selected in each wavelength range by the dimming plate switching unit 17. The data processing unit 25 performs baseline correction on the obtained absorbance using the baseline data measured in advance and acquires the final absorbance and the absorbance spectrum.

According to such a procedure, in the wavelength range in which the absorbance of the measurement sample is low, since the transmittance is high and the light intensity is high even at a high scanning speed, it is possible to obtain data having a favorable signal/noise ratio (S/N ratio). On the other hand, in the wavelength range in which the absorbance of the measurement sample is high, originally for data having a poor S/N ratio because the light intensity is small, the number of times of integration of A/D data is increased under a low scanning speed, and thus data having a favorable S/N ratio can be acquired. The spectrophotometer 100 can measure the absorbance in the form of one continuous absorbance spectrum corresponding to the entire measurement wavelength range by one scan while changing the measurement conditions. The method according to the present embodiment is particularly suitable for measuring a large number of measurement samples of the same type, that is, for which absorbance spectral characteristics can be figured out to a certain extent.

[Measurement Result Example]

Figure 4A:
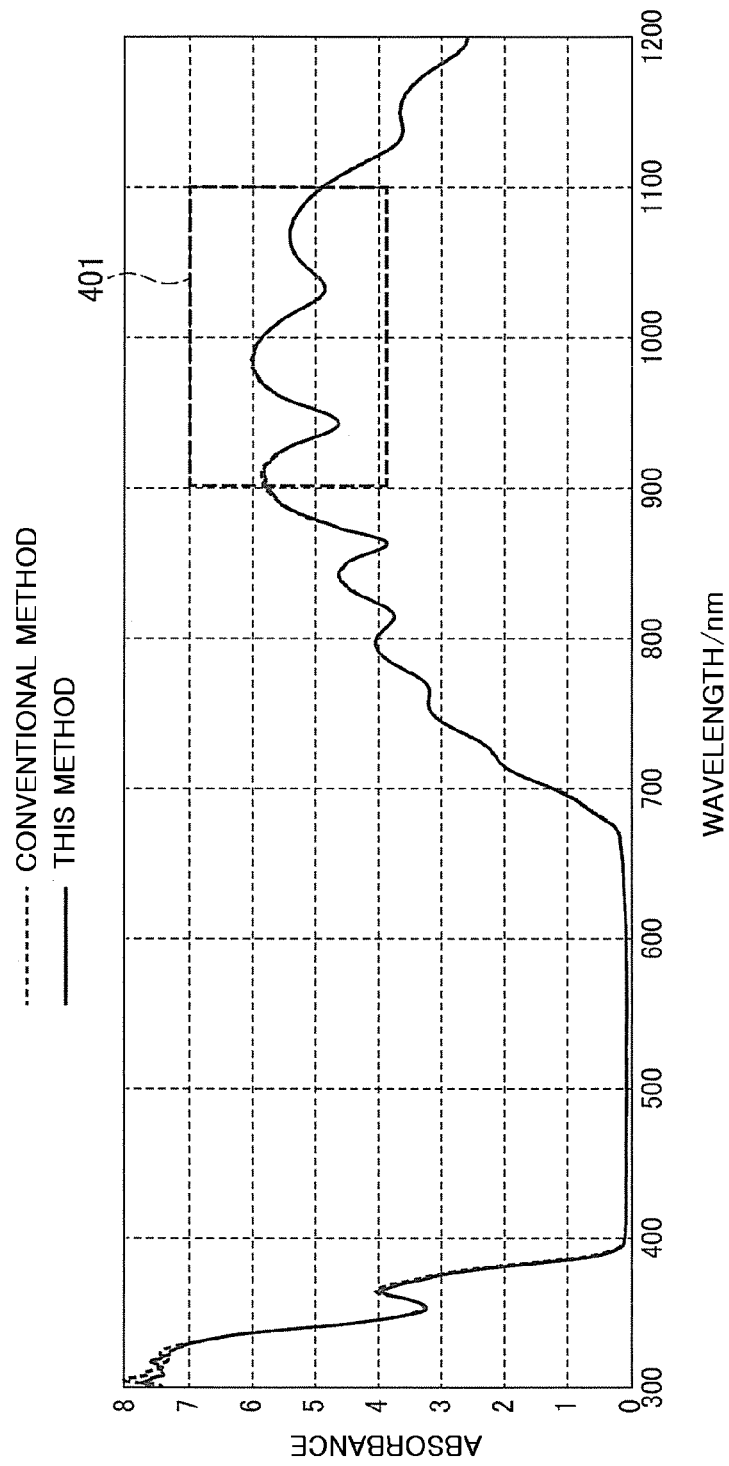
FIG. 4A is a graph showing absorbance spectrum for a predetermined substance.

FIG. 4A is a graph showing an example of the measurement result of the absorbance spectrum similar to that of FIG. 3. In FIG. 4A, the vertical axis represents absorbance, and the horizontal axis represents wavelength. FIG. 3 and FIG. 4A show a state in which the absorbance spectrum obtained by the conventional method and the absorbance spectrum obtained by the measurement method of the present embodiment overlap.

In the conventional method, the operator stops the spectrophotometer 100 for each wavelength range, sets measurement conditions, and acquires the absorbance spectrum for the entire measurement wavelength range by performing plurality of scans to start measurement again. Therefore, the burden and labor of the operator inevitably increase. On the other hand, in the method according to the present embodiment, as described above, the operator sets measurement conditions in advance based on the absorbance spectrum of the substance of the identical kind to the measurement sample, and acquires the absorbance spectrum by only one scan. Therefore, the burden on the operator according to the method according to the present embodiment is smaller than that of the conventional method.

Figure 4B:
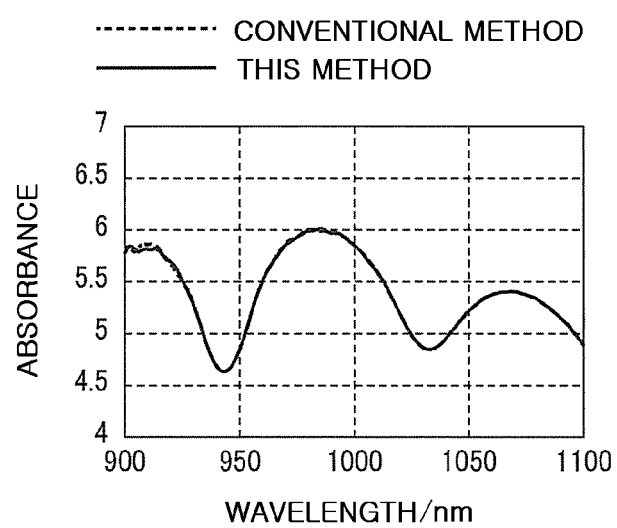
FIG. 4B is a graph showing an enlarged area of a part of FIG. 4A.

In the scales of FIG. 3 and FIG. 4A, no clear difference is observed between two absorbance spectrums. FIG. 4B is a graph showing an enlarged area 401 of FIG. 4A, that is, an absorbance spectrum in a wavelength range of 1,100 nm to 900 nm in which the absorbance is relatively high. In FIG. 4B, the vertical axis represents absorbance, and the horizontal axis represents wavelength. In such a wavelength range in which the absorbance is high, no clear difference is observed between two spectrums. That is, the accuracy obtained by a plurality of scans as in the related art can be realized with one scan.

Figure 5A:
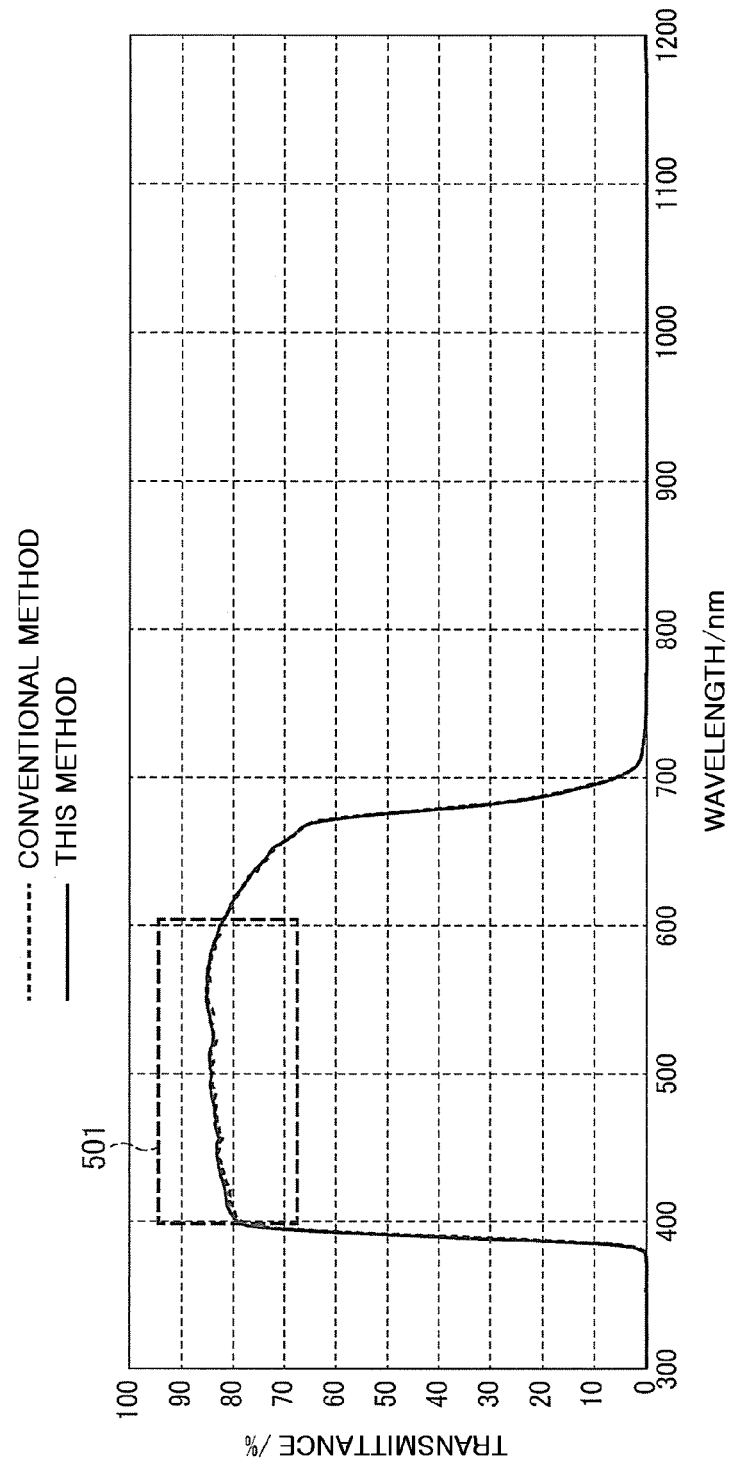
FIG. 5A is a graph showing a transmittance spectrum for a predetermined substance.
Figure 5B:
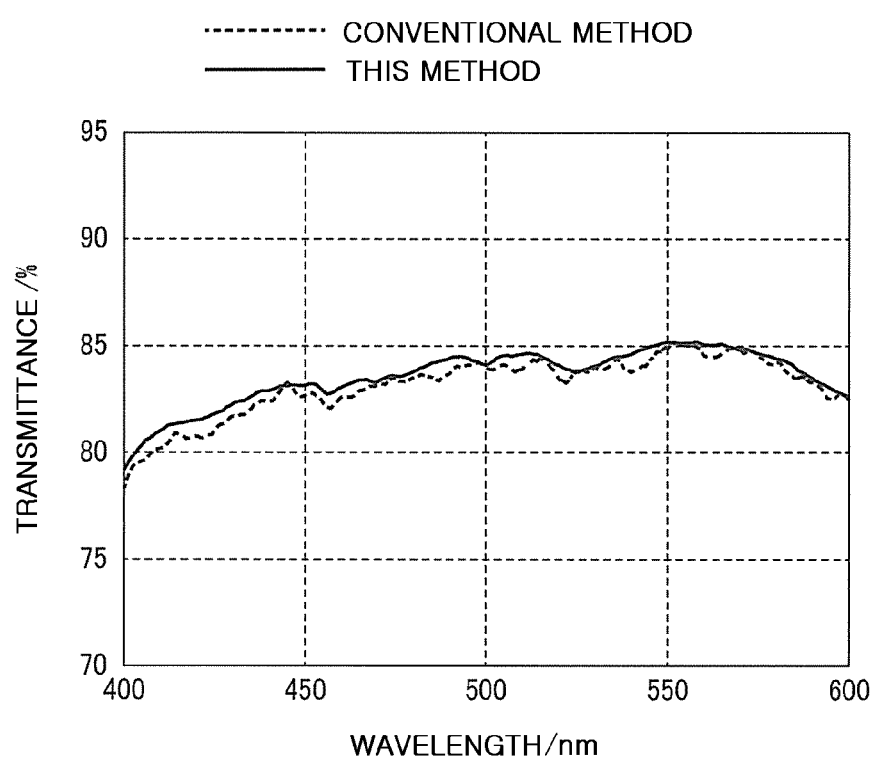
FIG. 5B is a graph showing an enlarged area of a part of FIG. 5A.

FIG. 5A is a graph showing the measurement result of the transmittance spectrum. FIG. 5B is a graph showing an enlarged area 501 shown in FIG. 5A, that is, a transmittance spectrum in a wavelength range of 600 nm to 400 nm in which the transmittance is relatively high. In FIG. 5A and FIG. 5B, the vertical axis represents transmittance, and the horizontal axis represents wavelength. As shown in FIG. 3 and FIG. 4A, in the wavelength range of 600 nm to 400 nm, the absorbance is extremely low, that is, the transmittance is high.

Even in such an area in which the transmittance is high, that is, the absorbance is low, as shown in FIG. 5B, no large difference is observed between two spectrums. That is, according to the method using the spectrophotometer 100 of the present embodiment, the absorbance with an accuracy comparable to that of the conventional method can be acquired by only one scan, and the burden on the operator can be significantly reduced while minimizing a decrease in the accuracy. That is, according to the present embodiment, even when a measurement sample whose absorbance greatly changes depending on the wavelength range is measured, it is possible to efficiently perform measurement with a high S/N ratio and high accuracy with fewer scans in the entire measurement wavelength range.

Second Embodiment

The first embodiment shows a configuration in which the operator divides the entire measurement wavelength range into a plurality of wavelength ranges using the operation unit 23 based on the absorbance spectrum for a substance of an identical kind to the measurement sample as shown in FIG. 3, and sets measurement conditions for each wavelength range. In the first embodiment, since the entire measurement wavelength range is scanned at once, the burden on the operator can be reduced as compared with the conventional method. However, the operator needs to set measurement conditions at least for each wavelength range whenever a measurement sample that is not similar to the substance for which the absorbance spectrum is obtained is measured. For example, when a measurement sample with an unknown absorbance spectrum is a measurement target, it is necessary to measure the spectrum of the measurement sample individually, manually set the boundary wavelength according to the measurement result, and set measurement conditions, and the burden on the operator can increase. Under such circumstances, it is desired to further reduce the labor of the operator by automating a series of processes by the operator.

Here, in a second embodiment of the present invention, a mode in which measurement conditions are automatically set and a measurement operation is performed under the measurement conditions will be described. Here, the same configurations as in the first embodiment will not be described, and description will focus on differences.

In the present embodiment, first, a measurement sample is installed in the spectrophotometer 100, the absorbance is measured in the entire measurement wavelength range without installing the dimming plate, and an approximate absorbance and absorbance spectrum in the entire measurement wavelength range are determined. After such a scan measurement as an assumption, that is, a prescan, is performed, the spectrophotometer 100 automatically sets measurement conditions including a dimming plate and a scanning speed based on the scanning result, and finally performs the main measurement for obtaining an absorbance of the measurement sample. In the present embodiment, the prescan is performed at a predetermined scanning speed, and is a constant speed here.

The controller 21 derives measurement conditions for each wavelength range from the absorbance spectrum obtained by the prescan, and the storage 22 stores the measurement conditions. For example, it is assumed that the absorbance spectrum obtained by the prescan includes a wavelength range in which the absorbance is smaller than 3 Abs, a wavelength range in which the absorbance is 3 Abs or more and 5 Abs or smaller, and a wavelength range in which the absorbance is larger than 5 Abs. In this case, the controller 21 determines the boundary wavelength that divides the wavelength ranges according to the value of the absorbance such as 3 Abs and 5 Abs. Similarly, the controller 21 determines the scanning speed according to the value of the absorbance. Here, when the boundary wavelength and the scanning speed are determined, a predetermined table or the like may be used. Here, the controller 21 generates a measurement condition table in which measurement conditions are recorded for each wavelength range divided by the boundary wavelength. The main measurement condition table may be stored in the storage 22 in a timely manner. The following Table 2 shows an example of the measurement condition table. The spectrophotometer 100 performs the subsequent measurement operation by the spectroscopic measurement program based on the measurement conditions recorded in the measurement condition table.

TABLE 2

| Absorbance Abs | Measurement conditions | |
|---|---|---|
| | Dimming plate | Scanning speed |
| Absorbance Abs < 3 | None | 750 nm/min |
| 3 ≤ Absorbance Abs ≤ 5 | 1/100 | 300 nm/min |
| Absorbance Abs > 5 | 1/1000 | 75 nm/min |

Figure 6:
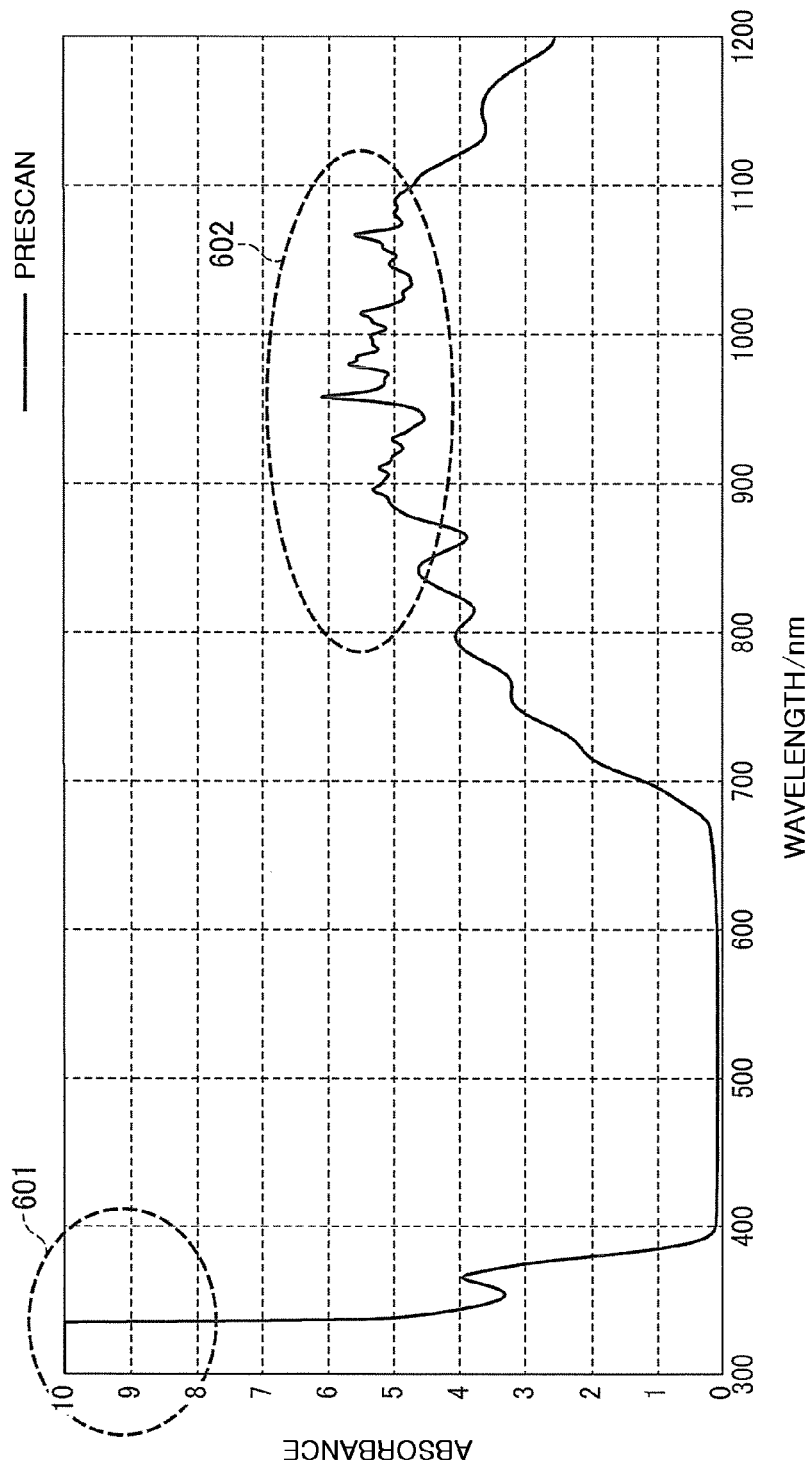
FIG. 6 is a graph showing an example of absorbance spectrum obtained by prescanning a measurement sample according to a second embodiment.

FIG. 6 is a graph showing an example of an absorbance spectrum obtained by prescanning a measurement sample. In FIG. 6, the vertical axis represents absorbance, and the horizontal axis represents wavelength. In the prescan, no dimming plate is installed, and the scanning speed is an arbitrary value. Therefore, in a wavelength range of 300 to 350 nm which is an area indicated by a dashed line 601 in this graph, the value of the absorbance is maximized, and an accurate value cannot be detected. In addition, in a range in which the absorbance is 4.9 Abs to 6.0 Abs such as a wavelength range of 800 to 1,100 nm which is an area indicated by a dashed line 602, noise is generated in an absorbance range in which measurement conditions are switched, frequent switching of the measurement conditions occurs, and there is a risk of smooth measurement being hindered.

Here, before the main measurement, it is preferable to sufficiently perform the smoothing process on the absorbance spectrum obtained by the prescan. When the smoothing process is performed, noise is minimized, switching of measurement conditions is inhibited, and smooth measurement can be expected.

The smoothing process can be performed for the entire measurement wavelength range. As the smoothing process, a general data smoothing process or the like can be used, and the type thereof is not particularly limited. The controller 21 may perform the smoothing process, a dedicated circuit such as a smoothing circuit may be provided in the control device 20, and the circuit may perform the smoothing process.

Here, even if the smoothing process is applied, an event in which measurement conditions change a plurality of times (for example, a predetermined number of times or more) within a wavelength range due to sharp change in the absorbance in the predetermined wavelength range (for example, an extremely narrow wavelength range) may occur. In such a case, the controller 21 may control the dimming plate switching unit 17 so that, in such a predetermined wavelength range, regardless of the fluctuation of the absorbance, a dimming plate having a dimming rate that is smaller than a predetermined value (for example, a dimming plate having a dimming rate of less than 1/100) is installed in the control optical path. Accordingly, the number of switching points for measurement conditions can be reduced and smooth measurement can be performed. Information about the set value of the wavelength range used here, the threshold value of the number of changes in the absorbance, and the designation of the dimming plate used as a dimming plate having a low dimming rate is defined in advance, and is stored in the storage 22.

In addition, measurement conditions may be determined so that a dimming plate having a higher absorbance is installed for the maximized wavelength range.

After the prescan is completed, the operator sets the measurement sample again in the spectrophotometer 100, and measures the absorbance for the entire measurement wavelength range by performing one wavelength scanning measurement. According to the above operation, the operator does not need to individually set optimal measurement conditions, and the spectrophotometer 100 can measure the absorbance of the measurement sample under measurement conditions automatically optimized for each wavelength range according to the spectroscopic measurement program.

(Measurement Condition Setting Process)

Figure 7:
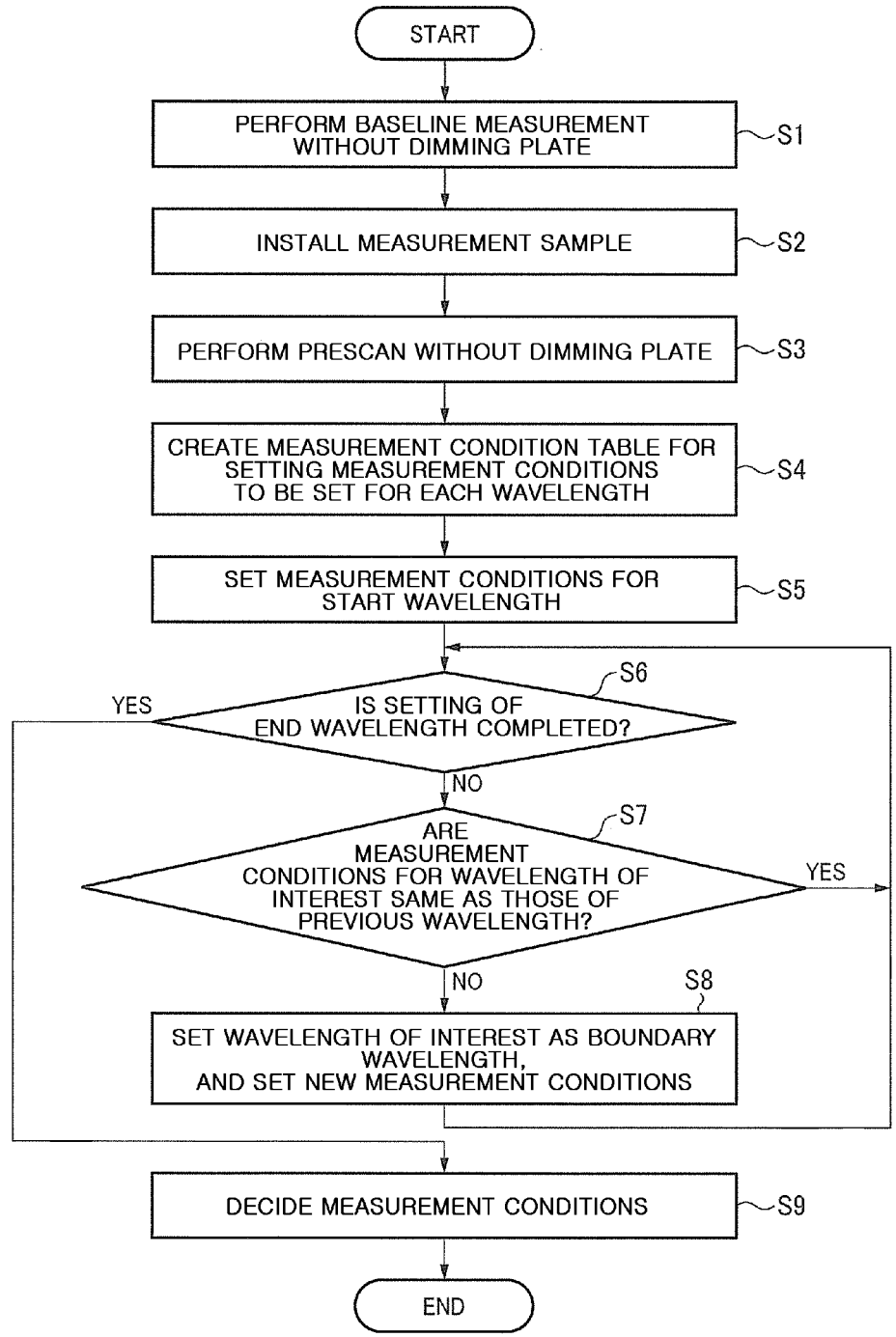
FIG. 7 is a flowchart showing a schematic procedure of a measurement condition setting method according to the second embodiment.

FIG. 7 is a flowchart of a measurement condition setting process according to the present embodiment. This process is a process performed before the measurement sample is measured, and it is performed instead of a setting operation performed by the operator in the first embodiment. This process flow may be realized by the controller 21 by reading and executing a corresponding program stored in the storage 22 based on various instructions from the operator.

In the initial state, the measurement sample is not installed in the spectrophotometer 100. In this state, the operator operates the operation unit 23 and activates the spectrophotometer 100. First, the spectrophotometer 100 performs baseline measurement for prescan without a dimming plate before the above prescan (Step S1). Here, baseline data for prescan for correcting the absorbance spectrum obtained later by the prescan is generated.

After the baseline measurement is completed, the operator installs the measurement sample in the measurement sample holder 15 of the spectrophotometer 100 and activates the spectrophotometer 100 again (Step S2).

The spectrophotometer 100 performs a prescan without a dimming plate, and acquires an approximate absorbance spectrum for the measurement sample installed in Step S2 (Step S3). The absorbance spectrum acquired here corresponds to the graph shown in FIG. 6. The controller 21 stores the acquired absorbance spectrum in the storage 22.

In addition, the controller 21 applies the smoothing process on the absorbance spectrum acquired by the prescan in Step S3, and additionally performs baseline correction using baseline data for prescan obtained in Step S1. Here, the controller 21 generates a measurement condition table for setting measurement conditions to be set for each wavelength range divided by the boundary wavelength (Step S4). The measurement condition table is a table in which the number of measurement conditions to be set according to the value of the absorbance Abs in the absorbance spectrum acquired in Step S3 is recorded. The controller 21 holds and manages the generated measurement condition table in, for example, the storage 22.

The following Table 3 is an example of measurement condition numbers and measurement condition set values set in the measurement condition table. For the entity in Table 2, the measurement condition number is provided for each absorbance value. Here, 3 Abs and 5 Abs are used as a reference absorbance for determining measurement conditions. However, the present invention is not limited thereto, and other values may be used. In addition, the number of reference points for the absorbance is not limited thereto, and may increase or decrease according to, for example, fluctuation of the absorbance spectrum.

TABLE 3

| Absorbance Abs | Number of conditions measurement | Measurement conditions Dimming plate | Scanning speed |
| --- | --- | --- | --- |
| Absorbance Abs < 3 | 1 | None | 750 nm/min |
| 3 ≤ Absorbance Abs ≤ 5 | 2 | 1/100 | 300 nm/min |
| Absorbance Abs > 5 | 3 | 1/1000 | 75 nm/min |

The controller 21 refers to the value of the absorbance Abs in the absorbance spectrum, and sets measurement conditions for the start wavelength at which scanning starts according to the conditions shown in Table 3 (Step S5). For example, in the example of FIG. 6, the start wavelength is set to 1,200 nm. In addition, in the example of FIG. 6, since the absorbance is about 2.5 Abs at 1,200 nm, which is the start wavelength, "1" is set as the measurement condition number, based on Table 3. Here, to correspond to the measurement condition "1," for the start wavelength, "none" is set for the dimming plate, "750 nm/min" is set for the scanning speed, and these are held in the measurement condition table. After the measurement conditions are set, the controller 21 focuses on the next wavelength. Here, the next wavelength may be specified with a predetermined fineness, and may be specified, for example, at intervals of 1 nm or other intervals.

The controller 21 determines whether the wavelength of interest is an end wavelength at which scanning is completed and setting of measurement conditions for the wavelength is completed (Step S6). In the example of FIG. 6, the end wavelength is 300 nm. When setting of measurement conditions is not completed (No in Step S6), the controller 21 refers to the value of the absorbance Abs in the absorbance spectrum and determines whether the measurement condition number of the wavelength of interest is the same value as the measurement condition number of the previous wavelength (Step S7). If the numbers are different (No in Step S7), the controller 21 sets the wavelength of interest as the boundary wavelength and additionally sets measurement conditions based on Table 3 (Step S8). Then, the process of the controller 21 returns to Step S6.

After Step S6 to Step S8 are repeated, when the process for all wavelengths is completed (Yes in Step S6), the controller 21 decides measurement conditions (Step S9). According to the above procedure, the spectrophotometer 100 can generate the absorbance for the entire measurement wavelength range and eventually measurement conditions for obtaining the absorbance spectrum without manually setting the boundary wavelength and measurement conditions for each wavelength range by the operator. Here, the process flow shown in FIG. 7 may be performed first only once when a similar sample is measured.

After the measurement conditions are decided (Step S9), the operator operates the operation unit 23 again, and operates the spectrophotometer 100. The spectrophotometer 100 performs baseline measurement for final measurement on the measurement sample in each wavelength range. The baseline measurement here corresponds to that described in the first embodiment. In this case, the result of the baseline measurement performed in Step S1 of FIG. 7 may be reused. Thus, the spectrophotometer 100 measures the absorbance of the measurement sample. For the absorbance spectrum obtained in this manner, the data processing unit 25 can acquire a final absorbance spectrum by performing baseline correction using the baseline data obtained by the baseline measurement.

According to the present embodiment, the measurement conditions are automatically set by performing the prescan. Therefore, according to the configuration of the present embodiment, in addition to the effects of the first embodiment, the burden on the operator during measurement can be further reduced.

Third Embodiment

Some measurement samples exhibit a rapid change in the absorbance in any wavelength range. For such a measurement sample, it is desirable to increase the wavelength resolution in this wavelength range for measurement, and in such a case, it is necessary to narrow the slit of the slit member 13 for measurement.

However, if the slit is narrowed to increase the wavelength resolution, the light intensity decreases. In order to deal with such a problem, it is necessary to lower the scanning speed, increase the number of times of integration of A/D data, and increase the S/N ratio in order to acquire data having a favorable S/N ratio.

On the other hand, in a wavelength range in which a rapid change in the absorbance does not occur, since it is not necessary to increase the wavelength resolution, the slit is widened, the light intensity is increased, the S/N ratio is increased, and thus measurement can be performed at a high scanning speed. Here, in a third embodiment of the present invention, the measurement conditions may include the slit width of the slit in addition to the dimming plate and the scanning speed for each wavelength range. Here, the controller 21 also changes the slit width according to the measurement conditions including the control value of the slit width for each wavelength range. Other configurations are the same as those of the first and second embodiments. The slit width according to the present embodiment may be set by the operator as in the first embodiment or may be automatically set on the side of the device as in the second embodiment.

According to the configuration of the present embodiment, in addition to the effects of the first and second embodiments, optimal measurement conditions can be set more precisely, and the overall measurement time can be shortened while improving the accuracy. Here, regarding setting the slit width, the slit members 13 having a plurality of different slit widths are prepared, these slit members 13 may be switched, and the slit width of the slit of one slit member 13 can be mechanically adjusted.

Other Embodiments

In the present invention, a program or an application for realizing functions of one or more embodiments described above is supplied to a system or a device using a network, a storage medium or the like, and one or more processors in the computer of the system or the device can read and execute the program to realize the functions.

In addition, functions may be realized by a circuit that realizes one or more functions. Here, examples of a circuit that realizes one or more functions include an application specific integrated circuit (ASIC) and a field programmable gate array (FPGA).

In addition, the present invention is not limited to the above embodiments, and can be appropriately modified or improved. In addition, the materials, shapes, sizes, numerical values, forms, numbers, disposition locations and the like of components in the above embodiments are arbitrary as long as the present invention can be achieved, and are not limited.

What is claimed is:

1. A spectrophotometer, comprising:
a light source;
a spectroscope that splits light from the light source;
an optical path switch that switches an optical path of light emitted from the spectroscope to a sample optical path that reaches a measurement sample whose absorbance changes depending on a wavelength range or a control optical path that reaches a control sample;
a detector that detects sample light that has passed through the measurement sample and control light that has passed through the control sample;
a data processing unit that derives absorbance of the measurement sample based on a measurement sample signal of the sample light and a control sample signal of the control light detected by the detector;
a plurality of dimming plates having different dimming rates;
a dimming plate switching unit that is able to switch and install the plurality of dimming plates in the control optical path;
a storage that stores measurement conditions including one of the plurality of dimming plates and a scanning speed for each of a plurality of wavelength ranges which has different absorbance for the measurement sample; and
a controller that changes a dimming plate and the scanning speed corresponding to each of the plurality of wavelength ranges according to the measurement conditions when the entire measurement wavelength range including the plurality of wavelength ranges is scanned at once.

2. The spectrophotometer according to claim 1, wherein the measurement conditions are preset based on measurement conditions for a substance of an identical kind to the measurement sample before the absorbance of the measurement sample is derived.

3. The spectrophotometer according to claim 2, wherein a boundary wavelength that divides each of the plurality of wavelength ranges is set according to a value of the absorbance in an absorbance spectrum obtained in advance for the substance of the identical kind.

4. The spectrophotometer according to claim 1, wherein the spectrophotometer performs a prescan without installing the dimming plate, and
wherein the controller additionally derives the measurement conditions for each of the plurality of wavelength ranges based on an absorbance spectrum obtained by the prescan.

5. The spectrophotometer according to claim 4, wherein the controller determines a boundary wavelength that divides each of the plurality of wavelength ranges based on a value of absorbance in the absorbance spectrum obtained by the prescan.

6. The spectrophotometer according to claim 4, wherein a boundary wavelength that divides each of the plurality of wavelength ranges is derived based on a value obtained by performing a smoothing process on the absorbance spectrum obtained by the prescan.

7. The spectrophotometer according to claim 6, wherein, when the measurement conditions change a predetermined number of times or more in a predetermined wavelength range of the absorbance spectrum after the smoothing process, the controller controls the dimming plate switching unit so that a dimming plate having a dimming rate smaller than a predetermined value among the plurality of dimming plates is installed in the control optical path in the predetermined wavelength range.

8. The spectrophotometer according to claim 4, wherein the controller performs baseline measurement for prescan when the measurement sample is not installed before the prescan and generates baseline data for prescan for correcting an absorbance spectrum obtained by the prescan.

9. The spectrophotometer according to claim 1, further comprising
a slit member having a slit through which light emitted from the spectroscope passes,
wherein the measurement conditions further include a slit width of the slit for each of the plurality of wavelength ranges, and
wherein the controller changes the slit width corresponding to each of the plurality of wavelength ranges according to the measurement conditions.

10. The spectrophotometer according to claim 1, wherein the spectrophotometer performs baseline measurement according to the measurement conditions when the measurement sample is not installed before absorbance of the measurement sample is derived, and generates baseline data for correcting the absorbance of the measurement sample.

11. A spectroscopic measurement method used in a spectrophotometer including a light source;

a spectroscope that splits light from the light source;

an optical path switch that switches an optical path of light emitted from the spectroscope to a sample optical path that reaches a measurement sample whose absorbance changes depending on a wavelength range or a control optical path that reaches a control sample;

a detector that detects sample light that has passed through the measurement sample and control light that has passed through the control sample;

a data processing unit that derives absorbance of the measurement sample based on a measurement sample signal of the sample light and a control sample signal of the control light detected by the detector;

a plurality of dimming plates having different dimming rates;

a dimming plate switching unit that is able to switch and install the plurality of dimming plates in the control optical path; and a storage that stores measurement conditions including one of the plurality of dimming plates and a scanning speed for each of a plurality of wavelength ranges which has different absorbance for the measurement sample, the method comprising a step of changing a dimming plate and the scanning speed corresponding to each of the plurality of wavelength ranges according to the measurement conditions when the entire measurement wavelength range including the plurality of wavelength ranges is scanned at once.

12. A program causing a spectrophotometer to execute a spectroscopic measurement method, the spectrophotometer including a light source;

a spectroscope that splits light from the light source;

an optical path switch that switches an optical path of light emitted from the spectroscope to a sample optical path that reaches a measurement sample whose absorbance changes depending on a wavelength range or a control optical path that reaches a control sample;

a detector that detects sample light that has passed through the measurement sample and control light that has passed through the control sample;

a data processing unit that derives absorbance of the measurement sample based on a measurement sample signal of the sample light and a control sample signal of the control light detected by the detector;

a plurality of dimming plates having different dimming rates;

a dimming plate switching unit that is able to switch and install the plurality of dimming plates in the control optical path; and a storage that stores measurement conditions including one of the plurality of dimming plates and a scanning speed for each of a plurality of wavelength ranges which has different absorbance for the measurement sample, the program executing the spectroscopic measurement method including:

a step of changing a dimming plate and the scanning speed corresponding to each of the plurality of wavelength ranges according to the measurement conditions when the entire measurement wavelength range including the plurality of wavelength ranges is scanned at once.

* * * * *